United States Patent Office 3,397,633
Patented Aug. 20, 1968

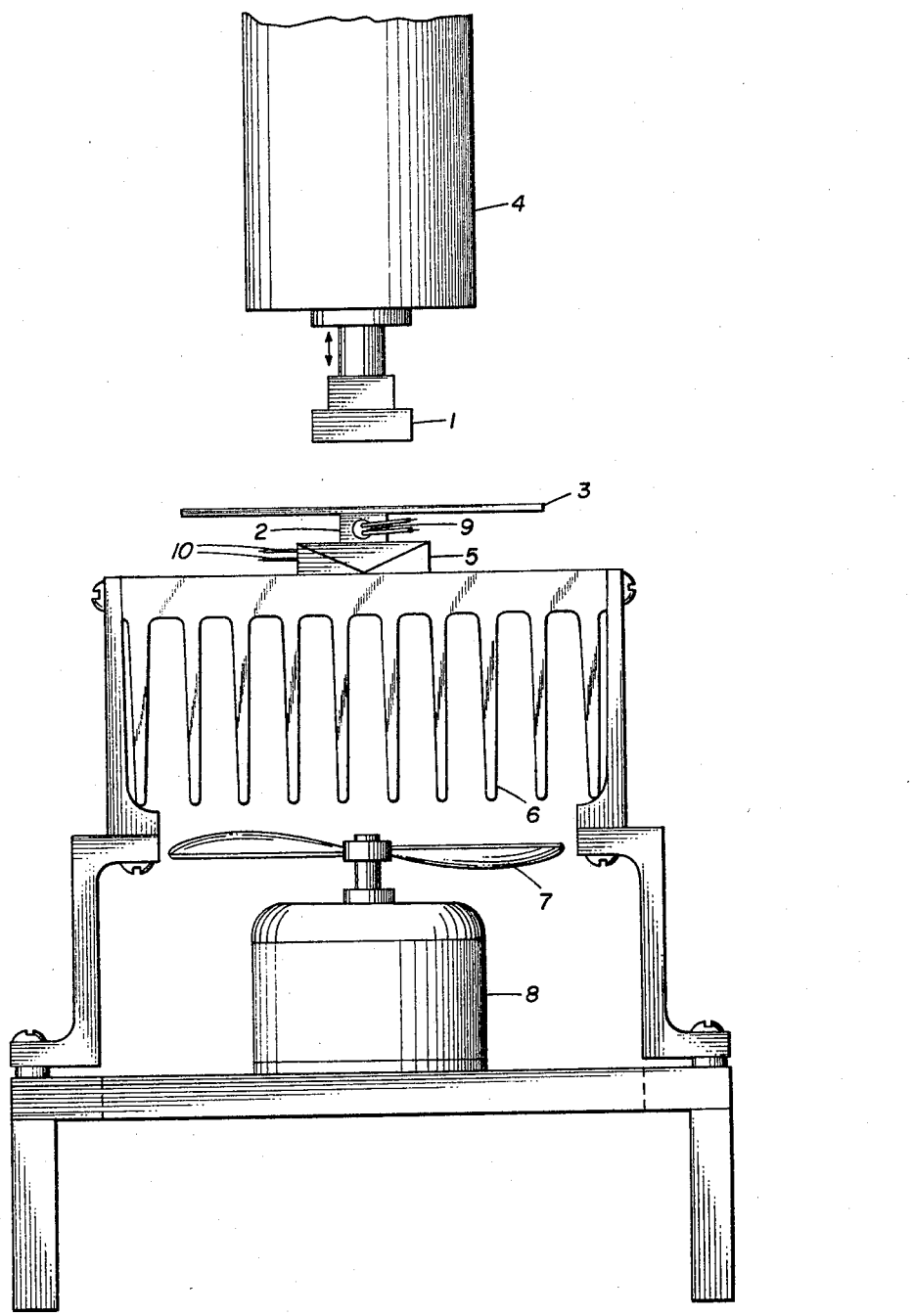

3,397,633
HEAT SEALING DEVICE
Robert Harris, 1 Fairchild Drive,
Bethel, Conn. 06801
Filed Oct. 15, 1965, Ser. No. 496,624
3 Claims. (Cl. 100—93)

ABSTRACT OF THE DISCLOSURE

Heat sealing of plastics along narrow sealing lines is effected with a device provided with two narrow dies between which the plastic to be sealed can pass. The dies are provided with means to bring them into contact with the plastic. At least one of the dies is in heat exchanging relation with a Peltier module. When the dies are brought together, current flows through the Peltier module in a direction to heat it and hence the narrow sealing die. When a sufficient temperature is reached to seal the plastic, temperature sensing means, such as a thermistor, reverses the current through the module to cool it off, and after it has reached a low enough temperature the dies are separated. More rapid cooling can be effected by having the Peltier module in contact with a finned heat sink over which cooling air can be blown.

Background of the invention

With the increasing use of thermoplastics for packaging and the like, it is necessary to provide for heat sealing to form bags and other containers, and a number of heat sealing devices have been developed for carrying out the procedure. The essentials of heat sealing include a suitable press, heating means for heating one or more of the two sealing dies, a hot cutting wire where it is necessary to cut a continuous flow of plastic into separate bags; and it has proven necessary to cool down the seal, as otherwise the seal may open up if the thermoplastic moves along while still at a temperature at which the seal has not set. The requirements have necessitated heating means for the press dies to effect the seal followed by means for cooling it off. It is quite common to use electric heaters for the heating, and cooling has been effected by air, cooling liquids and the like. In some presses there is no special cooling means, but these are less efficient, in many cases because the rate at which seals can be produced is decreased if one has to rely on ordinary convectional cooling of the plastic itself. Even where separate cooling zones or stations in the device are provided, there still is sometimes presented a problem that in moving from the heating zone to the cooling zone seals may open before they have been cooled to the safe point. In order to overcome this problem in some continuous cases where a continuous tube is made into bags, it is customary not to cut the bags apart until after the seal has been cooled. This also presents some problems in arrangement of equipment.

Summary of the invention

The present invention solves all of the problems and operates in an improved manner. Instead of using a separate heating and cooling device, a single thermoelectric module operating by means of the Peltier effect is employed. First, electricity runs through the thermoelectric module in a direction to heat it up locally, the heat being immediately transferred to one of the sealing dies, which is in thermal contact with the Peltier module, and then the direction of current flow is reversed and the module cools positively. During both these operations the plastic being sealed is held clamped tight against the sealing dies and there is, therefore, no possibility of a seal opening, because the pressure is not removed until the seal has been cooled. A satisfactory high rate of operation results and there is a greater reliability. Also, a single organization of dies and Peltier module performs both the functions of sealing and cooling, which formerly required separate elements. This of course reduces cost of the apparatus and also, which is sometimes of even more importance, a more compact apparatus results. In particular, there are no conduits for cooling gases or liquids but only the single pair of wires going to the Peltier module.

The sealing device of the present invention is so much more compact and light that it is impossible to design a portable sealer which is not very practical with the sealers used before. In such a portable device the sealing pressure is of course effected manually.

In automatic heat sealing devices for continuous production, various drives for the presses and conveyors for the material are synchronized together. Inasmuch as the present invention does not in any way change these parts of the machine, except for the requirement that the heating switch must be a reversing heating and cooling switch, the auxiliary and additional drives will not be shown in the drawings which follow so that the features of the present invention can be more clearly and succinctly set forth. It is an advantage of the invention that the drives and other parts of a continuous production machine are not changed and therefore no new designs become necessary.

Brief description of the drawings

The figure is an elevation, semidiagrammatic in nature with portions in section, of operating elements of the present invention.

Description of the preferred embodiments

Heat sealing dies 1 and 2 are provided with a slip sheet 3 to prevent adherence of the plastic to be sealed which passes through the device between the two sealing dies. The plastic itself is not shown. The movement, of course, is at right angles to the plane of the drawing.

The upper die 1 is actuated by a suitable means 4 which is shown diagrammatically as a block and may be pneumatic, toggle clamp, or any other suitable means. The particular operating means form, as such, no part of the present invention, and it is an advantage that any of the known types of means may be used.

In heat exchanging relation with the lower die 2 there is a Peltier module 5. The module is fed with electricity through the two wires 10. Control of the flow of electricity is obtained by means of the temperature sensor 9, which may be a thermistor or a thermocouple, which causes the direction of current through the wires 10 to reverse as soon as the die has reached the temperature for sealing, the reversal being through a conventional reversing switch (not shown). As the heating up of the plastic along the narrow line of seal is not quite instantaneous, the temperature, controlled by the sensor 9, may be and usually is slightly higher than the actual sealing temperature desired in the plastic. However, the heat transfer is so good and the line of sealing so small that the time of heating up of the plastic is very short and the temperature of the die therefore is only very slightly higher than the actual temperature in the plastic seal itself. The same speed of heating up also permits a satisfactory rate of operation where automatic sealing of a large number of seals is necessary.

In order to help the speed of cooling off of the Peltier module 5 when the electric current is reversed, it is mounted on a heat sink 6 which is provided with fins and cooled by a fan 7 driven by a motor 8. The heat sink and its cooling are shown diagrammatically in typical form, but of course any other means of cooling with water or other cooling fluids may be used.

In operation the plastic moves between the dies above the slip sheet 3 to the point where the seal is to be made. The dies then are pressed together by the closing means 4 and current is fed to the Peltier module 5 in the direction to cause it to heat up. The mass of the module is very small and the die 2, which is narrow, is also of small thermal mass, and therefore the die and so the zone of sealing in the plastic is brought up to sealing temperature very rapidly. As soon as the desired temperature is reached the sensor 9 reverses the flow of current through the Peltier module, through suitable conventional relays which are not shown, and the die 2 cools down very rapidly. The seal sets, the dies separate and the plastic is moved to present a new sealing zone. If it is desired to cut off the plastic, this may be done with a hot wire while the plastic is held in the press. This cutting off is operated in exactly the same manner as in conventional heat sealing devices and is therefore not shown, as it is not in any way changed by the present invention.

A single Peltier module in heat exchanging relation with only one of the two sealing dies is illustrated in the drawings. It is of course equally possible to have both dies provided with Peltier modules which, in some cases, is desirable in order to increase the rate at which the sealing device can operate. No problem is presented because the second Peltier module is connected to the outside only through flexible wires which do not interfere with the motion of the movable sealing die. As the operation of the sealing is in no way changed when both dies are heated and cooled, the provision of a Peltier module on the movable die 1 is not illustrated in the drawings.

I claim:
1. A heat sealing device for heat sealing thermoplastics along narrow heat sealing lines comprising in combination:
   (a) a pair of narrow heat sealing dies and means for bringing them intermittently into sealing position,
   (b) Peltier modules in heat exchanging relation with at least one of the dies, and
   (c) means controlled by the temperature of the sealing dies to apply electric current to the Peltier modules, first in a direction to heat and then in a direction to cool.
2. A heat sealing device according to claim 1 in which the Peltier modules are in heat exchanging relation with heat sinks maintained at a predetermined temperature.
3. A heat sealing device according to claim 2 in which the heat sinks are subjected to forced air temperature regulation.

References Cited

UNITED STATES PATENTS

| | | | |
|---|---|---|---|
| 3,029,178 | 4/1962 | Carver | 190—93 X |
| 3,047,051 | 7/1962 | Matveeff | 100—93 X |
| 3,133,539 | 5/1964 | Eidus | 62—3 X |
| 3,139,816 | 7/1964 | Jemison et al. | 100—93 X |
| 3,207,159 | 9/1965 | Tateisi | 62—3 X |
| 3,234,595 | 2/1966 | Weichselbaum et al. | 62—3 X |
| 3,256,920 | 6/1966 | Byers | 62—3 X |
| 3,282,267 | 11/1966 | Eidus | 62—3 X |
| 3,309,881 | 3/1967 | Beerman | 62—3 |

LOUIS O. MAASSEL, *Primary Examiner.*